(12) United States Patent
Kuwahara (10) Patent No.: US 9,573,424 B2
(45) Date of Patent: Feb. 21, 2017

(54) MOTORCYCLE TIRE

(71) Applicant: SUMITOMO RUBBER INDUSTRIES, LTD., Kobe-shi, Hyogo (JP)

(72) Inventor: Takao Kuwahara, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 516 days.

(21) Appl. No.: 14/075,580

(22) Filed: Nov. 8, 2013

(65) Prior Publication Data

US 2014/0158260 A1    Jun. 12, 2014

(30) Foreign Application Priority Data

Dec. 11, 2012 (JP) ................. 2012-270612

(51) Int. Cl.
 *B60C 11/03* (2006.01)
(52) U.S. Cl.
 CPC ........ *B60C 11/0304* (2013.04); *B60C 11/0302* (2013.04); *B60C 11/032* (2013.04); *B60C 11/0332* (2013.04); *B60C 2200/10* (2013.04)
(58) Field of Classification Search
 CPC .... B60C 11/03; B60C 11/0302; B60C 11/032; B60C 2011/0339; B60C 2011/0341; B60C 2011/0344; B60C 2011/0353; B60C 2011/0358; B60C 2011/0365; B60C 2011/0372; B60C 2011/0374; B60C 2011/0376; B60C 2011/0381; B60C 2011/0383; B60C 2200/10

(Continued)

(56) References Cited

U.S. PATENT DOCUMENTS

D659,079 S  *  5/2012  Takenaka ..................... D12/535
2010/0193095 A1*  8/2010  Nakagawa .......... B60C 11/0311
                                                                  152/209.5

(Continued)

FOREIGN PATENT DOCUMENTS

EP    2 179 867 A1    4/2010
EP    2 623 338 A1    8/2013

(Continued)

OTHER PUBLICATIONS

Extended European Search Report, dated Mar. 25, 2014, for European Application No. 13180330.6.

*Primary Examiner* — Eric Hug
(74) *Attorney, Agent, or Firm* — Birch, Stewart, Kolasch & Birch, LLP (57) ABSTRACT

A motorcycle tire is provided with crown main oblique grooves disposed on alternating sides of the tire equator and each extending from its axially inner end to its axially outer end, without cutting across the tire equator, while inclining to one circumferential direction, wherein the axially outer end is located outside an upstanding tire's ground contact annular zone. When measured in the annular zone, the circumferential distance between the circumferentially adjacent crown main oblique grooves existing on the same side of the tire equator is in a range of not more than 0.5 times an upstanding tire's ground contact length. In the annular zone, the crown main oblique grooves on one side of the tire equator is partially overlaps those on the other side. When measured in the annular zone, the circumferential length of the crown main oblique groove is less than the upstanding tire's ground contact length.

2 Claims, 4 Drawing Sheets (58) Field of Classification Search
USPC .............................. 152/209.11, 209.8, 209.9,
209.16,152/209.17, 209.28; D12/535, 506,
534, 569, D12/570
See application file for complete search history.

(56) References Cited

U.S. PATENT DOCUMENTS

2013/0014869 A1\* 1/2013 Makioka ............. B60C 11/0302
152/209.11
2013/0199682 A1\* 8/2013 Takenaka ............ B60C 11/0302
152/209.8
2013/0199683 A1\* 8/2013 Takenaka ............ B60C 11/0302
152/209.8

FOREIGN PATENT DOCUMENTS

JP          6-55909 A      3/1994
WO    WO 2011/080566    \*  7/2011  ......... B60C 11/0302

\* cited by examiner

MOTORCYCLE TIRE

BACKGROUND OF THE INVENTION

The present invention relates to a pneumatic tire for motorcycle, more particularly to a tread pattern for street use capable of improving transient characteristic and ride comfort while securing wet performance.

A motorcycle tire is required to have stable handling characteristic on dry roads from the upstanding state during straight running to a leaning state during cornering and vice versa. Especially required are appropriate suppleness (ride comfort) and transient characteristic which is uniform even if the leaning angle of the tire is changed. On wet roads, on the other hand, a high aquaplaning resistance is required. It is effectual for improving the aquaplaning resistance to provide grooves whose inclination angle is small with respect to the tire circumferential direction. However, such grooves have a tendency to decrease the generation of lateral force (such as cornering force and camber thrust) necessary for providing a good cornering performance on dry roads.

Japanese Patent Application Publication No. 06-55909 discloses a motorcycle tire, wherein in order to improve wet performance and cornering performance, a circumferentially continuously extending groove is disposed on the tire equator, and oblique grooves whose angle with respect to the tire circumferential direction is gradually increased toward the axially outside of the tire are disposed on each side of the tire equator.

In such a tread pattern, however, it is difficult to uniform the transient characteristic from the upstanding state during straight running to a leaning state during cornering and vice versa, therefore, there is still room for improvement in the cornering performance.

SUMMARY OF THE INVENTION

It is therefore, an object of the present invention to provide a motorcycle tire in which transient characteristic and ride comfort can be improved while securing a good wet performance, and thereby the cornering performance is improved.

According to the present invention, a motorcycle tire comprises a tread portion convexly curved so that the maximum cross section width of the tire lies between the tread edges, a pair of axially spaced bead portions, and a pair of sidewall portions extending between the tread edges and the bead portions, wherein the tread portion is provided with crown main oblique grooves, which are disposed on alternating sides of the tire equator, and each of which extends from its axially inner end Ai to its axially outer end Ao, without cutting across the tire equator, while inclining to one circumferential direction, wherein the axially inner end Ai and the axially outer end Ao are located inside and outside an upstanding tire's ground contact annular zone Yc, respectively, when measured in the upstanding tire's ground contact annular zone Yc, the circumferential distance L2 between the circumferentially adjacent crown main oblique grooves existing on the same side of the tire equator is in a range of not more than 0.5 times an upstanding tire's ground contact length LC1, in the upstanding tire's ground contact annular zone Yc, each of the crown main oblique grooves disposed on one side of the tire equator is partially overlaps, in the tire circumferential direction, the circumferentially adjacent crown main oblique grooves disposed on the other side of the tire equator, when measured in the upstanding tire's ground contact annular zone Yc, the circumferential length L1 of each of the crown main oblique grooves is in a range of less than 1.0 times the upstanding tire's ground contact length LC1.

The motorcycle tire according to the present invention may be provided with the following features (1)-(2):

(1) a pair of upstanding tire's shoulder regions Ys are each provided with shoulder main oblique grooves each of which extends from its axially inner end Bi positioned outside the upstanding tire's ground contact annular zone Yc to its axially outer end Bo, while inclining to the other circumferential direction opposite to said one circumferential direction, the angle $\beta$ of the shoulder main oblique groove with respect to the tire circumferential direction increases from its axially inner end Bi towards its axially outer end Bo, the width Gwb of the shoulder main oblique groove decreases from its axially inner end Bi towards its axially outer end Bo, the oblique grooves, which comprises the crown main oblique grooves and the shoulder main oblique grooves, include oblique grooves $20x$ extending across a cornering ground contact center line x, when measured along the cornering ground contact center line x, the distance Lx between the oblique grooves $20x$ is not more than 0.5 times a cornering ground contact length LC2;

(2) the distance L2 is not less than 0.4 times the upstanding tire's ground contact length LC1.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

The following specific terms used in this application including specification and claims are defined as follows:

"Developed half tread width w" is a curved axial distance measured from the tire equator to the tread edge along the tread.

"upstanding tire's ground contact annular zone YC" is an annular zone of the tread between the axial outermost edges of the ground contact patch SA of the upstanding tire (camber angle=0) in the normally inflated loaded condition.

"upstanding tire's ground contact length LC1" is the circumferential length of the ground contact patch SA of the upstanding tire.

"upstanding tire's shoulder region Ys" is an annular zone of the tread on each side of the upstanding tire's ground contact annular zone Yc.

"cornering ground contact center line x" is a circumferential line at a distance Kx from the tire equator, of 40% of the developed half tread width w, along the tread.

"cornering ground contact length LC2" is the circumferential length of the ground contact patch SB of the tire mounted on the standard wheel rim and inflated to the standard pressure and loaded with the standard tire load is relatively leant with respect to the road surface by inclining the road surface so that the ground contact patch SB becomes centered on the cornering ground contact center line x.

DESCRIPTION OF THE PREFERRED EMBODIMENTS

Embodiments of the present invention will now be described in detail in conjunction with accompanying drawings.

In the drawings, motorcycle tire 1 according to the present invention comprises a tread portion 2 having a tread 2S, a pair of axially spaced bead portions 4 each with a bead core 5 therein, a pair of sidewall portions 3 extending between the tread edges and the bead portions 4, a carcass 6 extending between the bead portions 4, and a tread reinforcing cord layer 7 disposed radially outside the carcass 6 in the tread portion 2.

Figure 1:
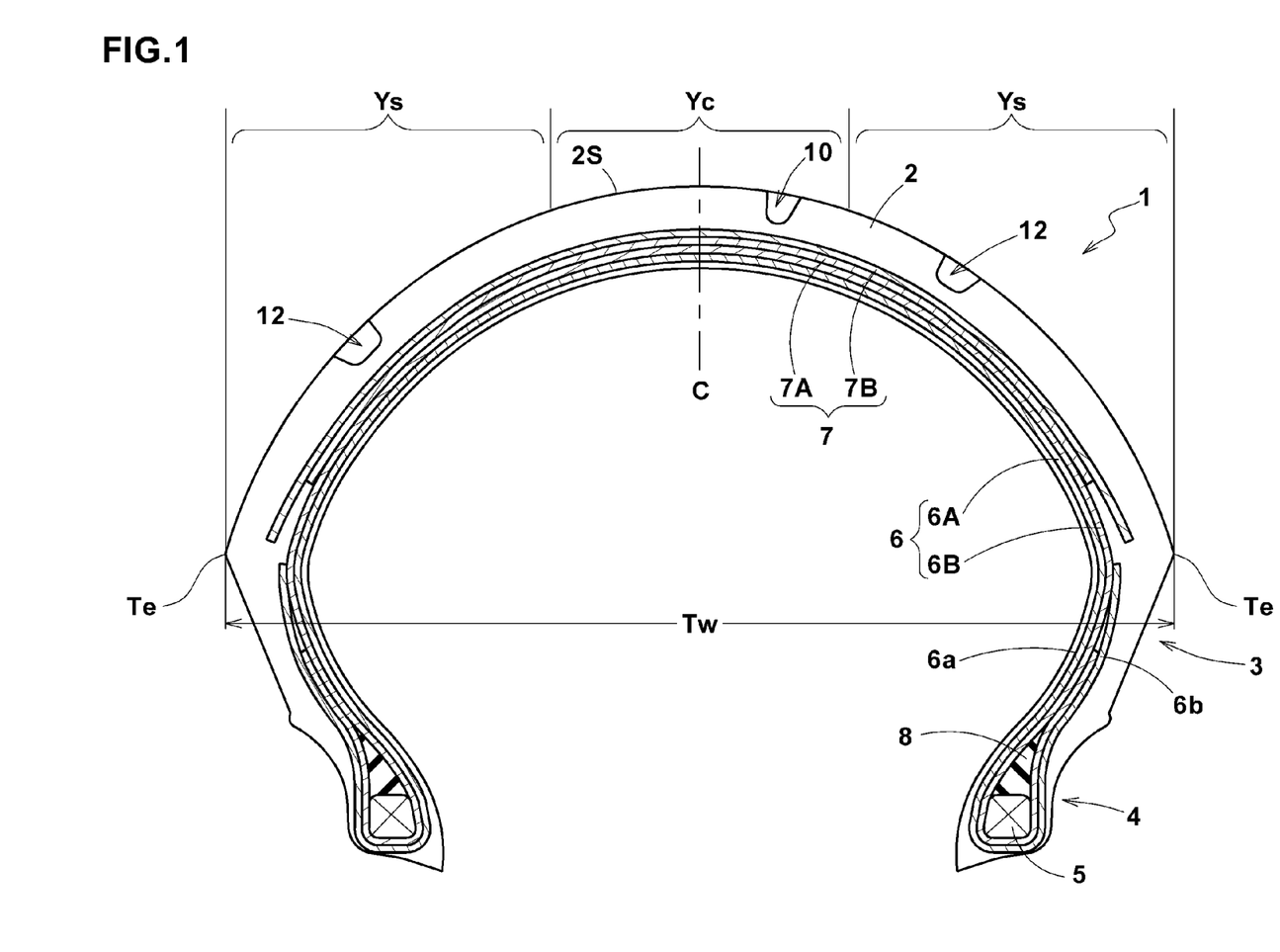
FIG. 1 is a cross sectional view of a motorcycle tire as an embodiment of the present invention.

In order to facilitate the leaning necessary when a motorcycle turns, the tread portion 2 (inclusive of the carcass 6, tread reinforcing cord layer 7 and a tread rubber thereon) is curved with a relatively small radius of curvature when compared with the passenger car tires, truck/bus tires and the like, and as a result, the maximum cross section width Tw of the tire lies between the tread edges Te.

The carcass 6 is composed of at least one ply, in this example two plies 6A and 6B of cords. The cords of each ply are arranged radially at an angle of from 60 to 90 degrees with respect to the tire equator C. Each ply 6A, 6B extends between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. As to the carcass structure, it is also possible to employ a bias ply structure in which the carcass ply cords are arranged at an angle of from 20 to 60 degrees with respect to the tire equator C.

The bead portions 4 are each provided between the main portion 6a and turned up portion 6b of the carcass ply with a bead apex 8 made of a hard rubber extending radially outwardly from the bead core 5 in a tapered manner in order to reinforce the bead portion 4.

As to the tread reinforcing cord layer 7, a breaker on the carcass, a band on the carcass, or both e.g. a combination of a breaker on the carcass and a band on the breaker may be employed. The breaker comprises at least two cross plies 7A and 7B of substantially parallel cords laid at an angle in a range of from 10 to 60 degrees (for example 20 degrees) with respect to the tire equator C. The band is composed of a cord or cords wound spirally at a small angle (about 5 degrees or less) with respect to the tire equator C.

Figure 2:
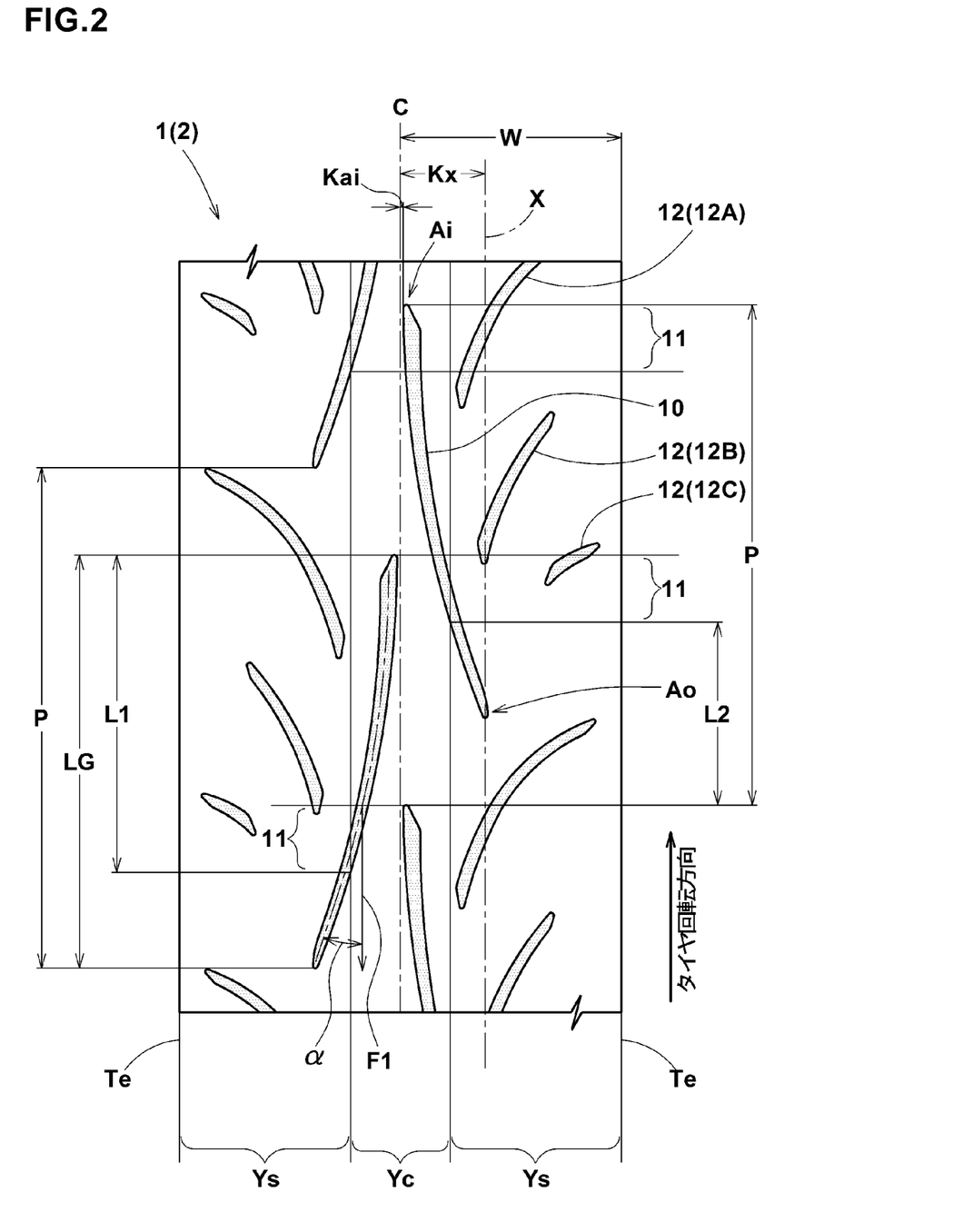
FIG. 2 and FIG. 3 are a developed partial view showing an example of the tread pattern to which reference characters are differently inserted.

The tire 1 is designed for street use, and its tread 2s is provided with tread grooves forming a tread pattern having a relatively high land ratio as shown in FIG. 2.

The tread grooves include crown main oblique grooves 10 disposed on alternating sides of the tire equator C.

Each of the crown main oblique grooves 10 extends from its axially inner end Ai to axially outer end Ao, without cutting across the tire equator C, while inclining to one circumferential direction (in this example, the opposite direction to the intended tire rotational direction).

In this example, the angle α of the crown main oblique groove 10 with respect to a circumferential line F1 is gradually increased from the inner end Ai to the axially outer end Ao. It is not essential but preferable that the angle α at the inner end Ai is set in a range of from 0 to 20 degrees, more preferably 0 to 10 degrees.

The axially inner end Ai of the crown main oblique grooves 10 is located near the tire equator C such that the distance Kai of the inner end Ai from the tire equator c is in the range of 0 to 5% of the developed half tread width w.

The axially outer end Ao of the crown main oblique grooves 10 is located outside the upstanding tire's ground contact annular zone Yc. The axially outer end Ao may be located on the axially outside of the cornering ground contact center line x.

The cornering ground contact center line x almost corresponds to the center line of the ground contact patch of the tire occurring in an intermediate state between the upstanding state and the maximally leaning state of the tire during cornering. The design in this position has a large influence on transient characteristic during cornering.

The circumferential pitches P of the crown main oblique grooves 10 disposed on one side of the tire equator C are equal to the circumferential pitches P of the crown main oblique grooves 10 disposed on the other side of the tire equator C.

The crown main oblique grooves 10 disposed on one side of the tire equator C are shifted from the crown main oblique grooves 10 disposed on the other side of the tire equator C by ½ pitch P in the tire circumferential direction.

In the upstanding tire's ground contact annular zone Yc, each of the crown main oblique grooves 10 disposed on one side of the tire equator C partially overlaps, in the tire circumferential direction, the circumferentially adjacent crown main oblique grooves 10 disposed on the other side of the tire equator C. (in the figures, overlap 11)

Figure 4:
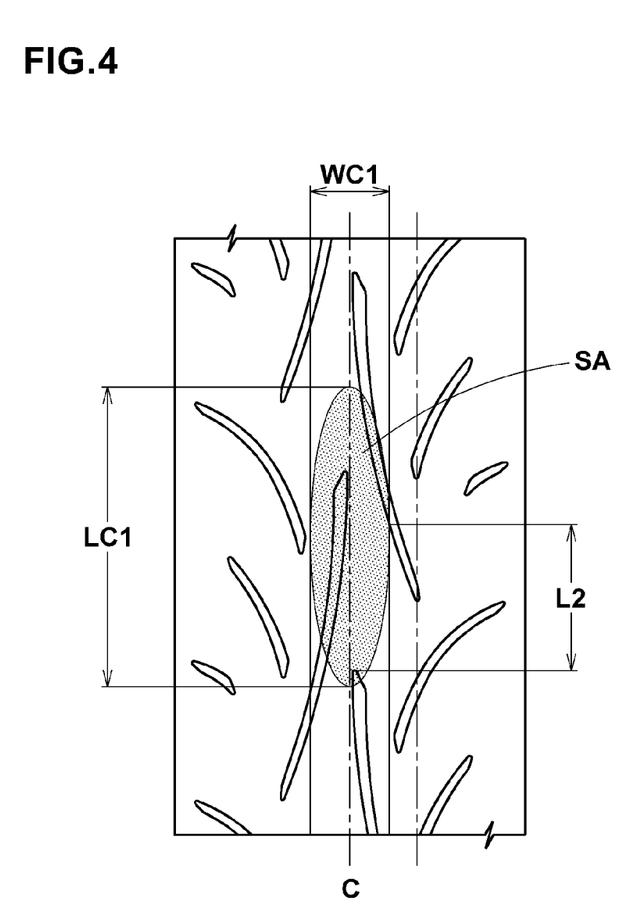
FIG. 4 shows a ground contact patch of the upstanding tire

When measured in the upstanding tire's ground contact annular zone Yc, the circumferential distance L2 between the circumferentially adjacent crown main oblique grooves 10 existing on the same side of the tire equator C is set in a range of not more than 0.5 times, preferably not less than 0.4 times the upstanding tire's ground contact length LC1. (FIG. 4)

when measured in the upstanding tire's ground contact annular zone Yc, the circumferential length L1 of each of the crown main oblique grooves 10 is set in a range of less than 1.0 times, preferably not less than 0.8 times the upstanding tire's ground contact length LC1.

Since the crown main oblique grooves 10 extend from the vicinity of the tire equator c to a position axially outside the upstanding tire's ground contact annular zone Yc while increasing the angle α, water existing in the ground contact patch SA (FIG. 4) can be effectively discharged toward the outside of the ground contact patch SA.

Since the crown main oblique grooves 10 are disposed on alternating sides of the tire equator c, and the crown main oblique grooves 10 on one side of the tire equator C overlap the crown main oblique grooves 10 on the other side of the tire equator C in the upstanding tire's ground contact annular zone Yc, the crown main oblique grooves 10 always exist in the upstanding tire's ground contact annular zone Yc during straight running, and a good drainage can be obtained.

since the circumferential length L1 of the crown main oblique grooves 10 is limited to less than 1.0 times the upstanding tire's ground contact length LC1, the lateral force necessary for the cornering initial-stage can be obtained.

If the length L1 is more than the ground contact length LC1, the angle α decreases and the generated lateral force decreases, thereby transient characteristic at the cornering initial-stage are deteriorated. If the length L1 is short, the drainage performance is deteriorated.

Since the circumferential distance L2 is not more than 0.5 times the upstanding tire's ground contact length LC1, variations of the lateral force and pattern rigidity occurring due to the grooved part and non-grooved part can be reduced. As a result, the lateral force generates smoothly, and the follow of the tread surface to the road surface is improved owing to the suppleness of the tread surface, thereby an appropriate initial-stage cornering force can be obtained.

If the distance L2 increases over 0.5 times the ground contact length LC1, the suppleness of the tread portion is decreased to deteriorate the ride comfort, and the variations of the lateral force is increased to deteriorate transient characteristic at the cornering initial-stage. If the distance L2 decreases, the rigidity of the tread portion decreases and the generated lateral force decreases, transient characteristic at the cornering initial-stage are deteriorated.

Figure 3:
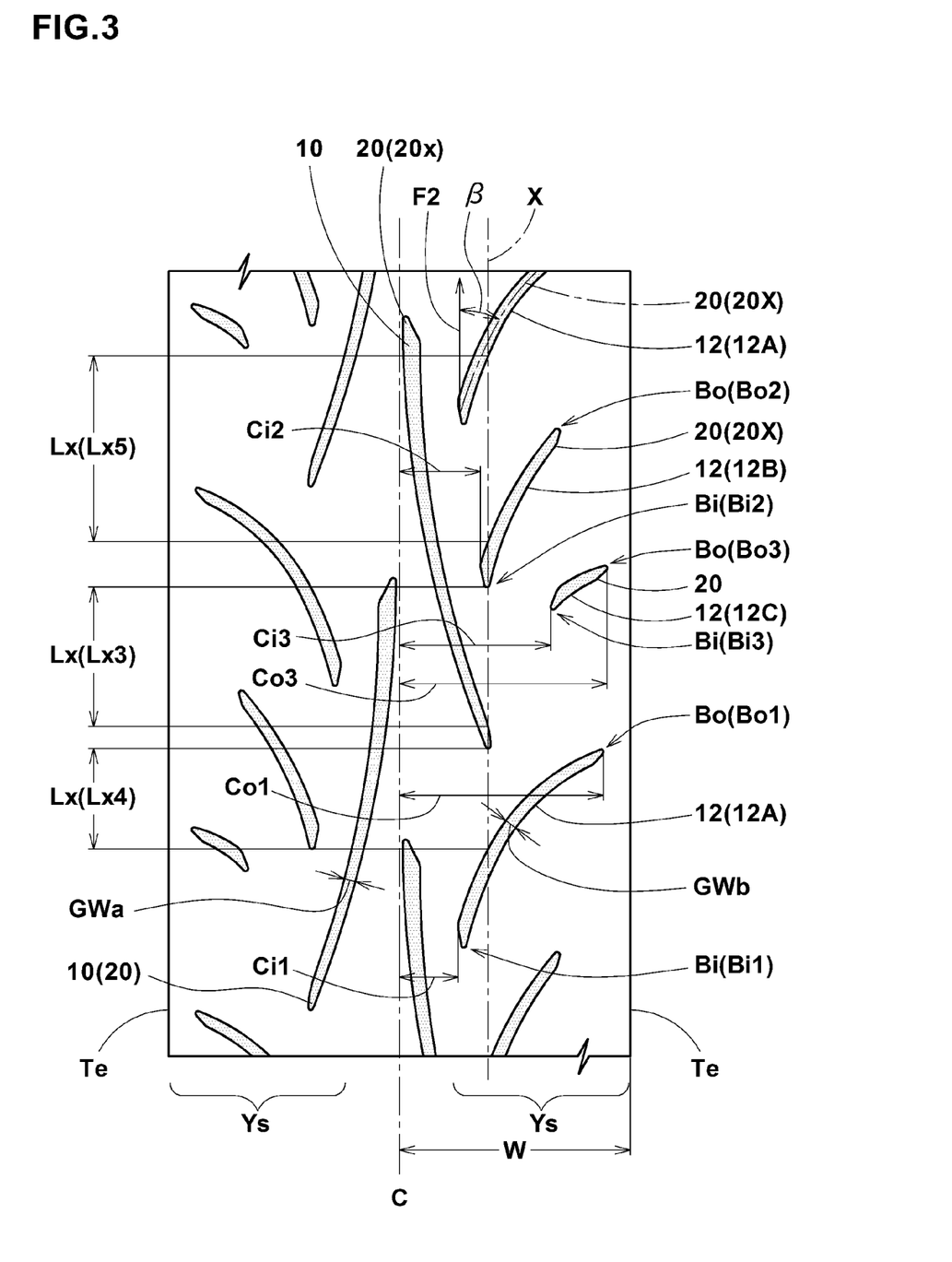

Each of the shoulder regions Ys is provided with shoulder main oblique grooves 12.

Each of the shoulder main oblique grooves 12 extends from its axially inner end Bi (positioned outside the ground contact annular zone Yc) to its axially outer end Bo, while inclining to the other circumferential direction (in the this example, corresponding to the intended tire rotational direction) as shown in FIG. 3. Namely, the shoulder main oblique grooves 12 are inclined oppositely to the crown main oblique grooves 10.

The angle β of the shoulder main oblique groove 12 with respect to a tire circumferential direction F2 increases from its axially inner end Bi towards its axially outer end BO.

The width Gwb of the shoulder main oblique groove 12 decreases from its axially inner end Bi towards its axially outer end BO. Preferably, the width Gwa of the crown main oblique groove 10 decreases from its axially inner end Ai towards its axially outer end Ao.

The oblique grooves 20, which comprises the crown main oblique grooves 10 and shoulder main oblique grooves 12, include oblique grooves 20x extending across the cornering ground contact center line x.

Figure 5:
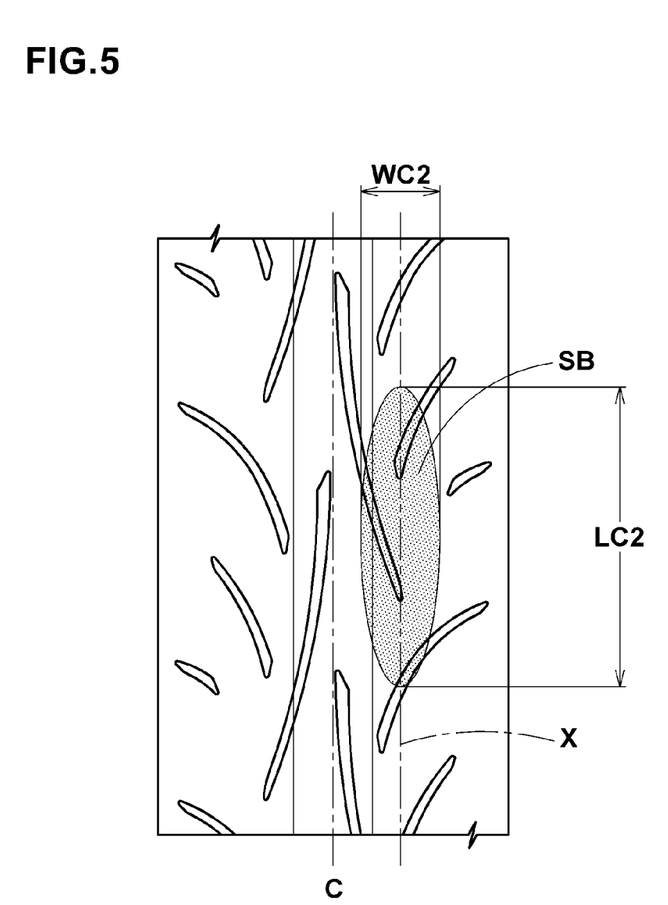
FIG. 5 shows a ground contact patch of the leant tire

When measured along the cornering ground contact center line x, the distance Lx between the oblique grooves 20x is not more than 0.5 times the cornering ground contact length LC2. (FIG. 5)

since the distance Lx is not more than 0.5 times the cornering ground contact length LC2, the shoulder main oblique grooves 12 can reduce variations of the lateral force and pattern rigidity occurring when the tire is leant due to the grooved part and non-grooved part, and as a result, the lateral force generates smoothly, and the follow of the tread surface to the road surface is improved owing to the suppleness of the tread surface, thereby the transient characteristic at the time of cornering can be improved.

Since the shoulder main oblique grooves 12 are inclined oppositely to the crown main oblique grooves 10, the shoulder main oblique grooves 12 can effectively resist to the resultant of the lateral force against the centrifugal force and the force in the braking direction due to the handle angle given at the time of cornering and, thereby the transient characteristic can be further improved.

Since the angle β of the shoulder main oblique groove 12 is increased toward the axially outside and the width is decreased, the generated lateral force is increased with the increase in the lean angle, and better transient characteristic can be achieved by the mutual interaction.

Since the shoulder main oblique groove 12 is inclined at the angle β, the drainage in the lateral direction is improved, and a good drainage can be obtained even when the tire is leant.

In this embodiment, the shoulder main oblique grooves 12 are first shoulder main oblique grooves 12A, second shoulder main oblique grooves 12B and third shoulder main oblique grooves 12C.

The first shoulder main oblique groove 12A is defined such that its axially inner end Bi1 is located axially innermost when compared with those of the second and third shoulder main oblique grooves 12B and 12C.

The axially inner end Bi1 is positioned axially inside the cornering ground contact center line x.

The distance Ci1 of the axially inner end Bi1 from the tire equator C is set in the range of 20 to 30% of the developed half tread width w.

The distance Co1 of the axially outer end Bo1 of the first shoulder main oblique groove 12A from the tire equator C is set in the range of from 80 to 95% of the developed half tread width w.

The third shoulder main oblique groove 12C is defined such that its axially inner end Bi3 is located axially outermost when compared with those of the first and second shoulder main oblique grooves 12A and 12B.

The axially inner end Bi3 is positioned axially outside the cornering ground contact center line x.

The distance Ci3 of the axially inner end Bi3 from the tire equator C is set in the range of 50 to 80% of the developed half tread width w.

The distance Co3 of the axially outer end Bo3 of the third shoulder main oblique groove 12C from the tire equator C is set in a range of from 80 to 95% of the developed half tread width w.

In the this example, the difference of the distance Co3 from the distance Co1 is set in a range of not more than 5 mm.

The second shoulder main oblique grooves 12B is accordingly defined such that, in the tire axial direction, its axially inner end Bi2 is located between the above-mentioned axially inner ends Bi1 and Bi3.

The axially inner end Bi2 is positioned axially inside the cornering ground contact center line x.

The distance Ci2 of the axially inner end Bi2 from the tire equator C is set in a range of from 20 to 50% of the developed half tread width w.

In the tire axial direction, the axially outer end Bot of the second shoulder main oblique groove 12B is positioned between the axially inner end Bi3 and axially outer end Bo3 of the third shoulder main oblique groove 12C.

In the first-third shoulder main oblique grooves 12A, 12B and 12C in this embodiment, the first shoulder main oblique groove 12A is longest, and the third shoulder main oblique groove 12C is shortest. One shoulder main oblique groove 12A, one shoulder main oblique groove 12B and one shoulder main oblique groove 12C are provided per one crown main oblique groove 10. The longest groove 12A is disposed on the axially inner end Ai side of the crown main oblique groove 10. The shortest groove 12C is disposed on the axially outer end Ao side of the crown main oblique groove 10. The middle-length groove 12B is disposed therebetween.

In this embodiment, the above-mentioned oblique grooves 20 are the crown main oblique grooves 10 and the first to third shoulder main oblique grooves 12A to 12C.
The oblique groove 20$x$ are the crown main oblique grooves 10 and the first and second shoulder main oblique grooves 12A and 12B.
Accordingly, the above-mentioned distance Lx set in the range of not more than 0.5×LC2, includes
the distance Lx3 between the crown main oblique groove 10 and the second shoulder main oblique groove 12B,
the distance Lx4 between the crown main oblique groove 10 and the first shoulder main oblique groove 12A and
the distance Lx5 between the second shoulder main oblique groove 12B and the first shoulder main oblique groove 12A.
Preferably, the ratio of the minimum to the maximum of the distance Lx is not less than 0.5.

The test tires had tread patterns based on that in FIG. 2 and specifications shown in Table 1.

Common specifications are as follows:
Carcass
    number of plies: 2
    cord material: nylon
    cord structure: 940 dtex/2
    cord angle: 70 degrees
Belt
    number of plies: 2
    cord material: aramid
    cord structure: 1670 dtex/2
    cord angle: 20 degrees
Developed half tread width w: 80 mm (1) upstanding tire's drainage performance test:

A motorcycle with a 600 cc four-cycle engine, which was provided with the test tire mounted on a MT3.50X17 wheel rim and inflated to 250 kPa as the front wheel and a common tire of size 180/55ZR17 mounted on a MT5.50X17 wheel rim and inflated to 290 kPa as the rear wheel, was run on a wet road surface in a test course, and the test rider evaluated the drainage performance during straight running.

The results are indicated in Table 1 by an index based on Embodiment 3 being 100, wherein the larger the number, the better the drainage performance.

(2) Transient characteristic and Ride comfort test:

The above-mentioned motorcycle was run on a dry asphalt road surface in the test course, and the test rider evaluated the transient characteristic and ride comfort.

The results are indicated in Table 1 by an index based on Embodiment 3 being 100, wherein the larger the number, the better the drainage performance.

TABLE 1

| Tire | Ex. 1 | Ex. 2 | Ex. 3 | Ref. 1 | Ex. 4 | Ref. 2 | Ex. 5 | Ex. 6 |
|---|---|---|---|---|---|---|---|---|
| length LC1 (mm) | 110 | 110 | 110 | 110 | 110 | 110 | 110 | 110 |
| width WC1 (mm) | 40 | 40 | 40 | 40 | 40 | 40 | 40 | 40 |
| length LC2 (mm) | 110 | 110 | 110 | 110 | 110 | 110 | 110 | 110 |
| width WC2 (mm) | 40 | 40 | 40 | 40 | 40 | 40 | 40 | 40 |
| length LG (mm) | 120 | 130 | 115 | 155 | 105 | 140 | 127 | 115 |
| length L1 (mm) | 95 | 105 | 90 | 120 | 85 | 110 | 102 | 91 |
| L1/CL1 | 0.86 | 0.95 | 0.82 | 1.09 | 0.77 | 1 | 0.93 | 0.83 |
| distance L2 (mm) | 50 | 52 | 45 | 68 | 40 | 78 | 55 | 44 |
| L2/CL1 | 0.45 | 0.47 | 0.41 | 0.62 | 0.36 | 0.71 | 0.5 | 0.4 |
| distance Lx3(mm) | 35 | 40 | 32 | 42 | 30 | 52 | 40 | 32 |
| Lx3/LC2 | 0.32 | 0.36 | 0.29 | 0.38 | 0.27 | 0.47 | 0.36 | 0.29 |
| distance Lx4(mm) | 28 | 32 | 26 | 45 | 24 | 32 | 32 | 26 |
| Lx4/LC2 | 0.25 | 0.29 | 0.24 | 0.41 | 0.22 | 0.29 | 0.29 | 0.24 |
| distance Lx5(mm) | 50 | 55 | 46 | 65 | 42 | 65 | 55 | 46 |
| Lx5/LC2 | 0.45 | 0.5 | 0.42 | 0.59 | 0.38 | 0.59 | 0.5 | 0.42 |
| upstanding tire's drainage | 105 | 110 | 100 | 115 | 95 | 110 | 110 | 100 |
| transient characteristic | 110 | 100 | 100 | 90 | 90 | 95 | 105 | 100 |
| ride comfort | 95 | 90 | 100 | 80 | 105 | 85 | 90 | 100 |

LG: length of crown main oblique grooves (FIG. 2)
WC1: width of upstanding tire's ground contact patch SA (FIG. 4)
WC2: width of cornering ground contact patch SB (FIG. 5)

The widths and depths of the crown main oblique grooves 10 and the shoulder main oblique grooves 12 may be arbitrarily selected from a range conventionally employed in the motorcycle tires for the drainage purpose.

Comparison Tests

Motorcycle tires of size 120/70ZR17 having the internal tire structure shown in FIG. 1 were manufactured experimentally and tested for upstanding tire's drainage performance, transient characteristic and ride comfort.

As shown in Table 1, Embodiment tires Ex.1 to Ex.3 were improved in the transient characteristic on dry road surface and ride comfort, while securing a good wet performance.

In Embodiment tire Ex.4, as the ratio L2/LC1 had a very small value of 0.36, the suppleness of the tread portion was increased to decrease the lateral force, and as a result, the transient characteristic became the same level as comparative example Ref.1. Further, as the groove length L1 was short, the drainage was inferior to Comparative example Ref.1.

The invention claimed is:

1. A motorcycle tire comprising:
a tread portion convexly curved so that the maximum cross section width of the tire lies between the tread edges,
a pair of axially spaced bead portions, and
a pair of sidewall portions extending between the tread edges and the bead portions, wherein
the tread portion is provided with crown main oblique grooves and shoulder main oblique grooves,
the crown main oblique grooves are disposed on alternating sides of the tire equator, and each extends from its axially inner end to its axially outer end, without cutting across the tire equator, while inclining to one circumferential direction and curving toward the axially inside,
the axially inner end and the axially outer end of each of the crown main oblique grooves are located inside and outside an upstanding tire's ground contact annular zone, respectively,
when measured in the ground contact annular zone of the upstanding tire, the circumferential distance L2 between the circumferentially adjacent crown main oblique grooves existing on the same side of the tire equator is in a range of not less than 0.4 times and not more than 0.5 times the ground contact length LC1 of the upstanding tire,
in the upstanding tire's ground contact annular zone, each of the crown main oblique grooves disposed on one side of the tire equator partially overlaps, in the tire circumferential direction, the circumferentially adjacent crown main oblique grooves disposed on the other side of the tire equator,
when measured in the upstanding tire's ground contact annular zone, the circumferential length L1 of each of the crown main oblique grooves is in a range of less than 1.0 times the ground contact length LC1 of the upstanding tire,
the shoulder main oblique grooves comprise
a first shoulder main oblique groove,
a second shoulder main oblique groove and
a third shoulder main oblique groove
which are disposed on the axially outside of each of the crown main oblique grooves,
wherein
the first shoulder main oblique groove extends from its axially inner end to its axially outer end, while inclining to the other circumferential direction opposite to said one circumferential direction and curving toward the axially inside,
the second shoulder main oblique groove extends from its axially inner end to its axially outer end, while inclining to the other circumferential direction opposite to said one circumferential direction and curving toward the axially inside, and
the third shoulder main oblique groove extends from its axially inner end to its axially outer end, while inclining to the other circumferential direction opposite to said one circumferential direction.

2. The motorcycle tire according to claim 1, wherein
the width of each said shoulder main oblique groove increases from its axially outer end towards its axially inner end,
the oblique grooves-inclusive of the crown main oblique grooves and the shoulder main oblique grooves, include oblique grooves extending across a cornering ground contact center line, and
when measured along the cornering ground contact center line, the distance Lx between the oblique grooves is not more than 0.5 times a cornering ground contact length LC2.

* * * * *